Dec. 2, 1969          I. E. WICKAM          3,481,451

STARTER FOR VIBRATORY CONVEYORS

Filed Dec. 26, 1967          3 Sheets-Sheet 1

INVENTOR.
IRWIN EDWARD WICKAM

BY *[signature]*

ATTORNEYS

INVENTOR.
IRWIN EDWARD WICKAM
BY
ATTORNEYS

# United States Patent Office 3,481,451
Patented Dec. 2, 1969

3,481,451
STARTER FOR VIBRATORY CONVEYORS
Irwin Edward Wickam, Comstock Park, Mich., assignor to Rapistan Incorporated, Grand Rapids, Mich., a corporation of Michigan
Filed Dec. 26, 1967, Ser. No. 693,318
Int. Cl. B65g 27/10
U.S. Cl. 198—220                          10 Claims

ABSTRACT OF THE DISCLOSURE

The purpose of the invention is to preload the springs of a vibratory type conveyor so that the energy of the springs can be utilized in cooperation with the motor to initiate the conveyor's operation. The invention utilizes a reciprocating motor such as a hydraulically actuated piston to shift the conveyor bed to a position at which the springs are fully compressed when the springs are fully loaded, their resistance is utilized to close the circuit to the conveyor drive motor. The starting of the conveyor drive motor automatically disconnects the reciprocating motor which remains idle until the next time the conveyor has to be started.

BACKGROUND OF THE INVENTION

Vibratory conveyors of the natural frequency type have been known for many years as is taught by U.S. Patent 2,664,995, issued Jan. 5, 1954, to Renner and U.S. Patent 3,291,289, issued Dec. 13, 1966, to Savage. These conveyors move materials, particularly bulk materials, by oscillating motion of their bed, which, in effect, causes the material to be thrown ahead by the initial part of each oscillating stroke and then the bed shifted back, with a result that the material rests after each oscillation at a point shifted a short distance along the conveyor bed. These conveyors have the advantage of moving materials both rapidly and efficiently and, when in operation, having a low power demand. However, the starting power required by these conveyors is disproportionate, being many times that required to operate the conveyor, once it is in motion. This necessitates the use of motors having much greater horsepower than is required for operation except at the moment of start. It also necessitates use of bearings, shafts, pulleys, and other related drive mechanism components which are completely disproportional to the normal operating requirement of the conveyor.

The problem arises from the fact that these conveyors come to rest where the forces within the springs are balanced. To start the conveyor, the springs must be compressed until they reach the maximum loading to which they are subjected in the conveyor's operation. Once this point is reached, the energy of the springs cooperates with the motor rather than working against it, and the power demand drops precipitously. It is the object of this invention to provide a way in which the springs can be preloaded and, thus, their energy used to cooperate with the motor rather than to resist it at the initiation of the conveyor's operation.

SUMMARY OF THE INVENTION

Conveyors of this type are normally driven by a motor which rotates a shaft. The shaft is connected to a drive bar which, in turn, is connected to the conveyor bed. The connection between the drive bar and the shaft is eccentric, causing the drive bar to reciprocate as the shaft rotates. This invention adds to that conventional structure a one way clutch, by which an arm is connected to the shaft. This arm is connected to a suitable reciprocating motor such as a cylinder with a hydraulically operated piston. When the conveyor is to be started, the cylinder is charged, extending the piston which, by means of the one way clutch, rotates the shaft until the conveyor bed is shifted to a position in which the springs are fully compressed. At this point, preferably by automatic means, the conveyor operating motor is energized and the motor, together with the springs, puts the conveyor bed in motion with the compressed energy of the springs, cooperating with the motor, to initiate the conveyor bed's reciprocating motion. In the type of arrangement just described, the energy of the springs, when they are fully loaded, closes a switch to the conveyor drive motor.

DESCRIPTION FOR THE PREFERRED EMBODIMENTS

Figure 4:
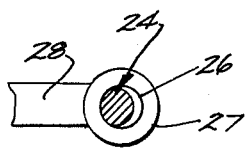
FIG. 4 is a fragmentary sectional elevation view taken along the plane IV—IV of FIG. 3.

The numeral 10 indicates a conveyor having a material conveying bed 11 and a base frame 12. The conveyor bed 11 has spring mounting blocks 13 at spaced intervals along its underside. The base frame 12 has similar blocks 14 along its top face. The blocks 13 and 14 are arranged in pairs with parallel spaced faces between each pair of which extend several springs 15. Thus, the springs are arranged in groups at spaced intervals along the length of the conveyor. In the particular form of the conveyor shown, the springs 15 are of the coil type. The conveyor bed 11 and the base frame 12 are also connected by leaf type stabilizer springs 16. This describes only one form of conveyor to which this invention can be applied. For example, the coil springs can be omitted and only leaf springs employed. In such a case additional leaf springs will be employed. A drive mechanism 20 is located at one end of the conveyor. This consists of a motor 21 which, by means of a belt 22, drives a pulley 23 mounted on the end of the shaft 24. The shaft is suitably supported on the base frame 12 by the journal blocks 25. Between the journal blocks 25, the shaft 24 has an eccentric portion 26 (FIG. 4). The offset portion 26 is surrounded by a pair of bearing blocks 27, each of which is connected to the end of a connecting rod 28. The other ends of the connecting rods 28 are pivotally mounted to an axle 29, the ends of which are connected to the conveyor bed by means of bearings 30 mounted in the connecting plates 31.

All of the structure described up to this point is conventional and well understood in the field of spring mounted, oscillating conveyors, particularly those conveyors classified as natural frequency conveyors.

The end of the shaft 24 projecting beyond the bearing block 25 opposite from the pulley 23 mounts a one-way clutch 40. The clutch is so designed that when rotated in the direction of the arrow A in FIG. 1, the clutch engages the shaft 24 and rotates the shaft with the clutch. However, the clutch automatically releases once the shaft is rotating in the same direction at a speed higher than that of the clutch. The clutch has a depending arm 41, the lower end of which is connected to the piston 42 of the cylinder assembly 43. The opposite end of the cylinder in turn is pivotally mounted to the base frame 12 by suitable means such as the pin 44. It will be understood that the cylinder could be either pneumatic or hydraulic depending upon the particular energy source available.

OPERATION AND CONTROL

Figure 1:
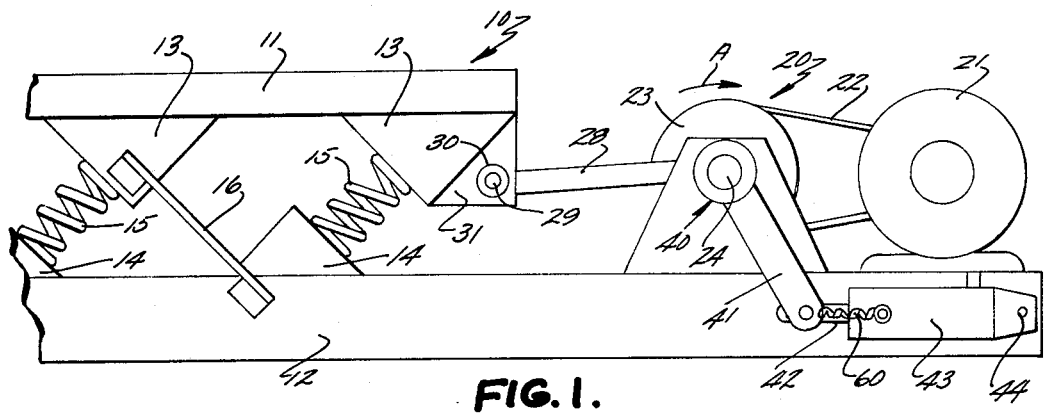
FIG. 1 is a fragmentary side elevation view of a natural frequency conveyor to which this invention has been applied showing the conveyor in an inoperative at rest position.
Figure 3:
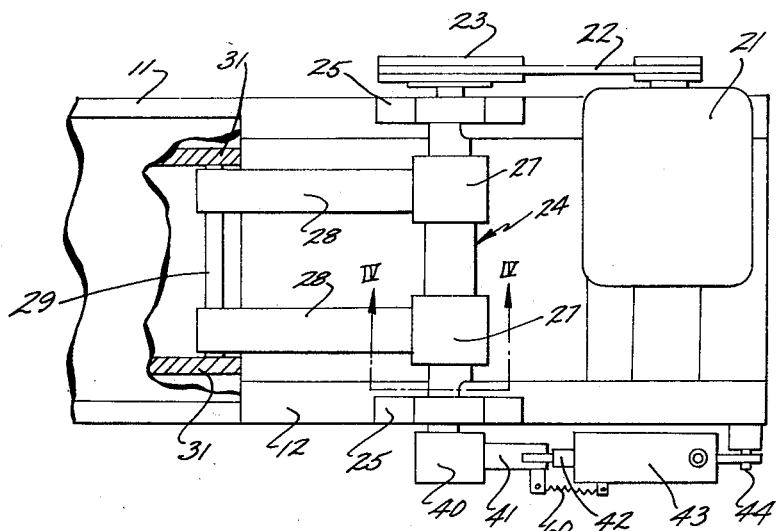
FIG. 3 is a fragmentary plan view of the invention.

The conveyor is shown in its normal, at rest position in FIG. 1. In this condition, the load imposed upon the strings 15 is equal to their resistance to the load and a balance of forces is attained. This is true, whether the conveyor bed is loaded or unloaded; the only difference between the two conditions being that the springs will be somewhat more compressed when the conveyor bed is loaded. It will be noted that the arm 41 is shifted to its maximum position to the right when this condition exists.

Figure 2:
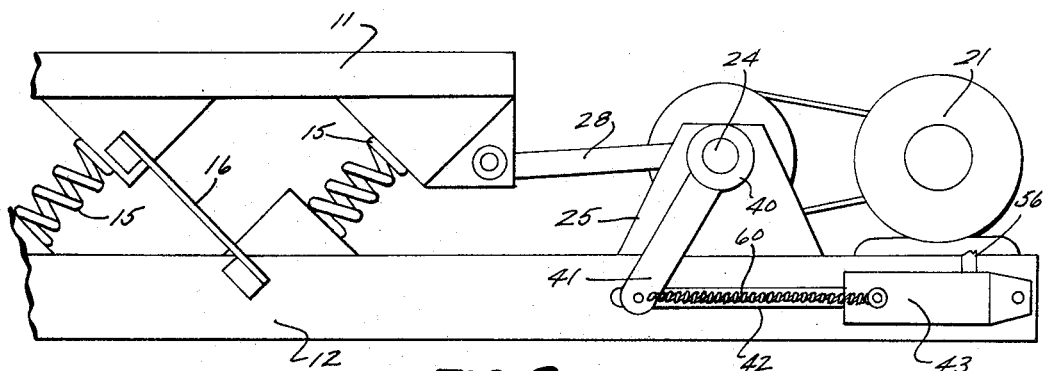
FIG. 2 is a view similar to FIG. 1 except the conveyor shown in the position it attains when the springs are fully loaded and the motor is energized.
Figure 5:
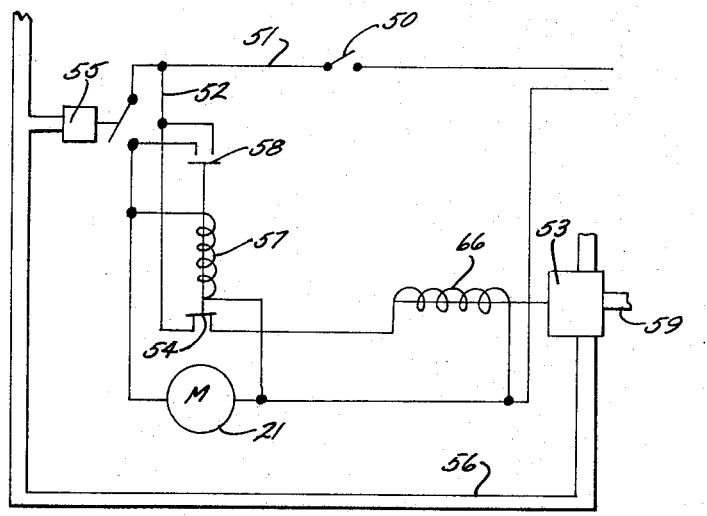
FIG. 5 is a schematic diagram of the controls for coordinating the operation of the preloader and the conveyor operating motor.

To initiate operation of the conveyor, the manual control switch 50 (FIG. 5) is closed. This energizes the lines 51 and 52. The line 52 is connected to the solenoid 66 of the solenoid operated valve 53 through the normally closed switch 54. When the switch 50 is open, the switch 54 is closed and the pressure switch 55 is also open. The closing of the circuit 52 causes the valve 53 to open, admitting air or hydraulic fluid through the line 56 to cylinder 43, extending the piston 42. Extension of the piston 42 rotates the shaft 24 until the springs 15 are fully compressed as shown in FIG. 2. There is no difference in this operation whether the conveyor is equipped with coil springs, coil and leaf springs, or leaf springs alone. At this point, the pressure in the line 56 shifts the pressure switch 55 to closed position, actuating the motor 21. At the same time, the solenoid 57 is actuated, opening the switch 54 and closing the switch 58.

The opening of the switch 54 causes the solenoid valve 53 to close shutting off the supply of air or hydraulic fluid to the cylinder 43 and automatically opening the line 56 to a suitable bleed line 59. The motor 21 being in operation, the piston 42 is no longer operationally connected to the shaft 24 since the one-way clutch 40 has released. At this point, the spring 60 takes over, retracting the piston 42 and the arm 41. This repositions the piston 42 ready for the next start. This situation will continue so long as the conveyor is in operation.

The conveyor is stopped by opening the switch 50. As soon as this happens, the solenoid 57 is de-energized, causing the switch 58 to open and the switch 54 to close, resetting the entire control system ready for the next conveyor start.

Figure 6:
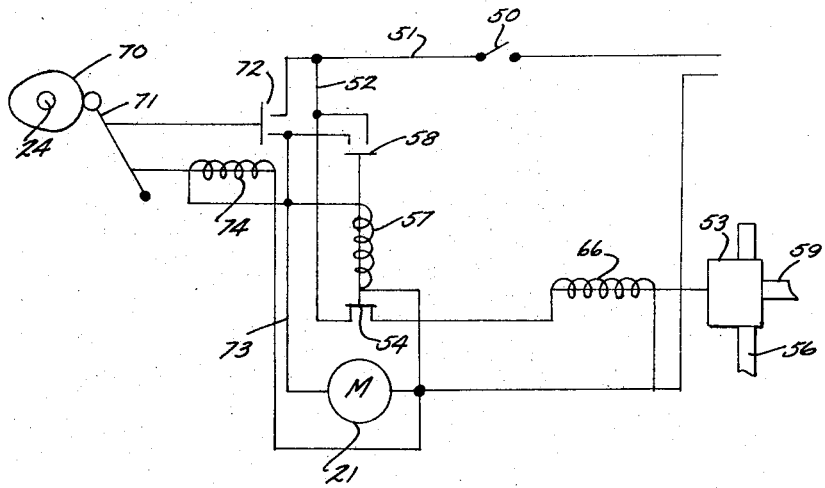
FIG. 6 is a schematic diagram of a modified form of this invention.

FIG. 6 illustrates a modified control for this invention. A cam 70 mounted on the shaft 24 is substituted for the pressure switch 55. When the shaft 24 is rotated to position the eccentric at maximum spring compression the cam shifts the arm 71 closing the switch 72. This closes circuit 73 to the motor 21 and shifts the solenoid to open switch 54 and close switch 58. At the same time solenoid 74 is actuated to withdraw the arm 71, rendering it inactive until operation of the conveyor has again ceased.

Figure 7:
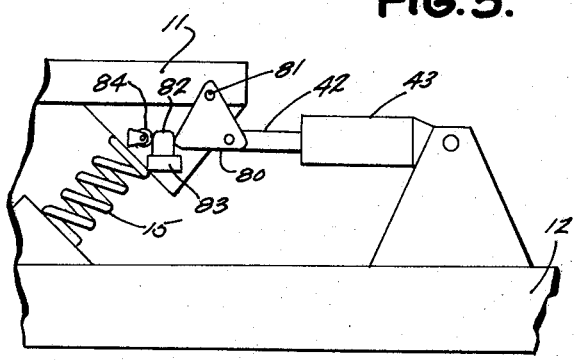
FIG. 7 is a fragmentary, side elevation view illustrating a modified construction for this invention.

FIG. 7 illustrates a further modification in which the shifting of the conveyor bed is done by applying the loading force directly to the bed rather than through the conveyor drive mechanism. In this arrangement, the piston 42 of the cylinder 43 is connected to one corner of a plate 80. Another corner of the plate 80 is pivotally secured to the conveyor bed by the stud 81. When the conveyor is at rest, the third corner of the plate 80 is in the path of an extended stop 82. A solenoid 83, when actuated, retracts the stud, permitting the plate 80 to swing freely about the stud 81. To load the springs 15, the piston 42 is extended. This forces the third corner of the plate 80 against the stop 82. The load is transmitted through the stop to the fixed backup roller 84. When the springs are fully loaded, the solenoid is actuated, retracting the stop. The width of the stop is such that the plate 81 can swing freely as the bed 11 is oscillated even though the piston 42 is stationary.

Figure 8:
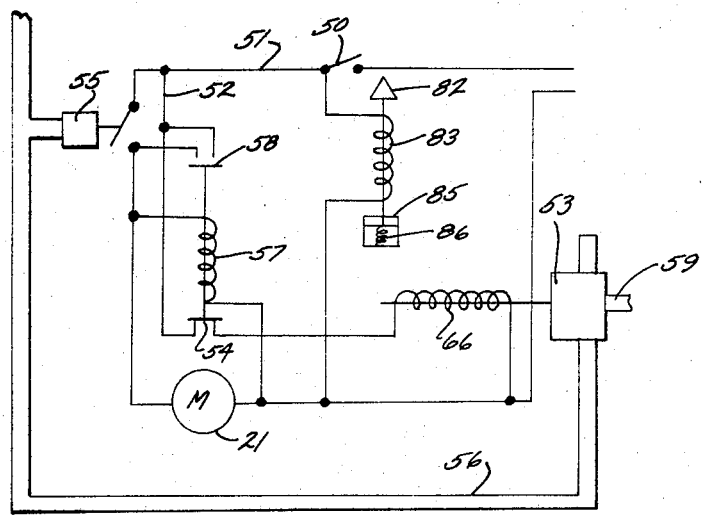
FIG. 8 is a schematic diagram of the controls used in the modified construction illustrated in FIG. 7.

The control system for this is illustrated in FIG. 8. This system is the same as that illustrated in FIG. 5 except for the addition of the solenoid 83. The solenoid 83 is equipped with a dashpot 85 which permits immediate retraction of the stop 82 but retards its extension. This prevents the spring 86 from extending the stop 82 so fast when the conveyor is deactivated that the stop becomes extended before the bed's momentum has been expended.

It will be seen that this arrangement provides a simple, inexpensive, and yet effective means to overcome the objectionably high power requirements necessary for starting a vibratory type conveyor. Thus, the motor 21 and the remainder of the drive mechanism for the conveyor can be designed to the power factors incident to the conveyor's normal operating requirements, rather than to the excessively high requirements incident to its initial starting demand. The cost of the equipment can be materially reduced and the life of the equipment can be significantly extended since it is not subjected to high, instantaneous load factors.

It will be recognized that means other than hydraulic or pneumatically operated cylinders may be utilized to preload the springs 15. It will also be recognized that the controls, which have been described and illustrated, are merely illustrative of any of several arrangements which could be used to produce the same result.

While a preferred embodiment of this invention, together with two modified embodiments have been described, it will be recognized that other modifications of this invention can be made which will embody the principles of the invention. Such of these modifications which do embody these principles are to be considered as included in the hereinafter appended claims unless these claims, by their language, expressly state otherwise.

I claim:

1. In a conveyor of the vibratory type having a material transporting bed supported for oscillation on a plurality of springs and a primary drive for reciprocating the bed lengthwise, the bed, during each cycle of oscillation alternately compressing and extending the springs whereby at each limit of compression and extension the springs have a substantial reserve of energy to be released in the following half-cycle of operation, the improvement comprising: a secondary drive connected to said bed; said secondary drive, when activated, shifting said bed to a position wherein said springs are at one limit of compression or extension and preloaded; the connection between said secondary drive and said bed including a release element disconnecting said bed from said secondary drive when said primary drive is activated.

2. The improvement in conveyors described in claim 1 wherein there is provided means to activate said primary drive means when said springs are at one of said limits of compression or extension.

3. The improvement in conveyors described in claim 2 wherein said means to activate said primary drive is responsive to the resistance to preloading exerted by said springs.

4. The improvement in conveyors described in claim 2 wherein said means to activate said primary drive is responsive to the position of said bed.

5. The improvement in conveyors of the vibratory type having a material transporting bed supported for oscillation on a plurality of springs and a drive means for reciprocating the bed lengthwise, the bed during each cycle of oscillation alternately compressing and extending the springs whereby at each limit of extension and compression the springs have a substantial reserve of energy to be released in following half-cycle of operation, the drive means having a primary motor and a shaft rotatably mounted on said conveyor and connected to said primary motor; a rod connected at one end to said bed and at the other end to said shaft, the connection between said shaft and said rod being eccentric of the axis of rotation of said shaft and imparting reciprocating motion to said rod, the improvement in said conveyor comprising: a secondary motor and means connecting said secondary motor to said shaft to rotate said shaft, said means having a release element disconnecting said secondary motor from said shaft when the primary motor is energized.

6. The improvement in conveyors described in claim 5 wherein said secondary motor is a fluid operated piston and cylinder and said release element is a one-way clutch.

7. The improvement in conveyors described in claim 5 wherein means are provided to energize said primary motor when said springs are fully preloaded.

8. The improvement in conveyors described in claim 7 wherein said means includes a sensor activated by the resistance to preloading exerted by said springs.

9. The improvement in conveyors described in claim 5 wherein a sensor is provided to register the force exerted by said springs as they are preloaded; said sensor closing the primary circuit for said primary motor when said springs are fully preloaded; a circuit bypassing said sensor to supply energy to said motor after it has been once energized, said bypass circuit being closed when said primary circuit is closed.

10. The improvement in conveyors described in claim 5 wherein said secondary motor is a fluid operated cylinder having a reciprocating piston; said release element is a one-way clutch mounted on said shaft; an arm secured to said clutch and connected to said piston for rotating said shaft when said piston is shifted in one direction; means for shifting said piston in the other direction; a sensor registering the force exerted by said springs as they are preloaded; said sensor closing the primary circuit for said primary motor when said springs are fully loaded and shutting off the supply of fluid to said cylinder; a secondary circuit bypassing said sensor to supply energy to said motor after it has been once energized, said bypass circuit being closed by said sensor simultaneously with the closing of said primary circuit.

References Cited

UNITED STATES PATENTS

| | | | |
|---|---|---|---|
| 2,751,068 | 6/1956 | Haddox | 198—220 |
| 3,412,845 | 11/1968 | Erisman | 198—220 |
| 3,263,802 | 8/1966 | Haley | 198—220 |
| 2,772,770 | 12/1956 | Bergmann | 198—220 |

EVON C. BLUNK, Primary Examiner

R. S. GAITHER, Assistant Examiner